United States Patent
Juergensmeyer

(10) Patent No.: US 9,249,845 B2
(45) Date of Patent: Feb. 2, 2016

(54) FRICTION SWITCH COUPLING

(71) Applicant: LICOS Trucktec GmbH, Markdorf (DE)

(72) Inventor: Jan Juergensmeyer, Friedrichshafen (DE)

(73) Assignee: Licos Trucktec GmbH, Markdorf (DE)

( * ) Notice: Subject to any disclaimer, the term of this patent is extended or adjusted under 35 U.S.C. 154(b) by 129 days.

(21) Appl. No.: 13/872,412

(22) Filed: Apr. 29, 2013

(65) Prior Publication Data

US 2014/0318920 A1    Oct. 30, 2014

(51) Int. Cl.
F16D 27/04      (2006.01)
F16D 27/112     (2006.01)
F16D 27/00      (2006.01)

(52) U.S. Cl.
CPC ............ *F16D 27/112* (2013.01); *F16D 27/004* (2013.01)

(58) Field of Classification Search
CPC ................................................ F16D 2129/065
USPC ...................... 192/84.3, 84.31, 84.93, 84.961
See application file for complete search history.

(56) References Cited

U.S. PATENT DOCUMENTS

| | | | |
|---|---|---|---|
| 2,765,878 A | | 10/1956 | Pierce |
| 4,910,422 A | | 3/1990 | Brinkmann et al. |
| 5,847,478 A | * | 12/1998 | Usui et al. ...................... 310/76 |
| 2007/0246322 A1 | * | 10/2007 | Schachtl et al. ........... 192/84.31 |
| 2008/0210512 A1 | | 9/2008 | Pescheck et al. |
| 2009/0314600 A1 | * | 12/2009 | Kato et al. ................. 192/84.31 |
| 2009/0321214 A1 | * | 12/2009 | Hoshino et al. ........... 192/84.961 |

FOREIGN PATENT DOCUMENTS

| | | |
|---|---|---|
| DE | 37 06 400 C2 | 2/1991 |
| DE | 10 2004 057 848 A1 | 6/2006 |
| EP | 1 288 518 A1 | 3/2003 |
| JP | 08-312678 A1 | 11/1996 |
| JP | 09-303452 A1 | 11/1997 |
| JP | 10-267052 A1 | 10/1998 |
| JP | 2002-340034 A1 | 11/2002 |
| JP | 2006-336745 A1 | 12/2006 |

OTHER PUBLICATIONS

German Search Report dated Nov. 10, 2011.
European Search Report, European Patent Application No. 11010122.7, dated Sep. 25, 2013 (6 pages).

* cited by examiner

*Primary Examiner* — Rodney H Bonck
*Assistant Examiner* — Stacey Fluhart
(74) *Attorney, Agent, or Firm* — Burr & Brown, PLLC

(57) ABSTRACT

A friction switch coupling for torque transmission from a rotor which can be driven about an axis to an element to be driven, including a friction disk clutch with an electromagnet arrangement which includes a coil body and a ferromagnetically conductive coil carrier supporting and at least partly surrounding the coil body, which the carrier has a web segment lying radially outermost in relation to the coil body and oriented parallel to the axis, and an inner web segment, and between the inner and outer web segments of the coil carrier are provided permanent magnet means via which an axially movable friction segment of the friction switch coupling can be connected magnetically with the rotor, so that when the electromagnet arrangement is in electrically connected state, by weakening of the magnetic attraction effect of the permanent magnet means, the contact of the friction segment on the rotor can be eliminated.

7 Claims, 1 Drawing Sheet

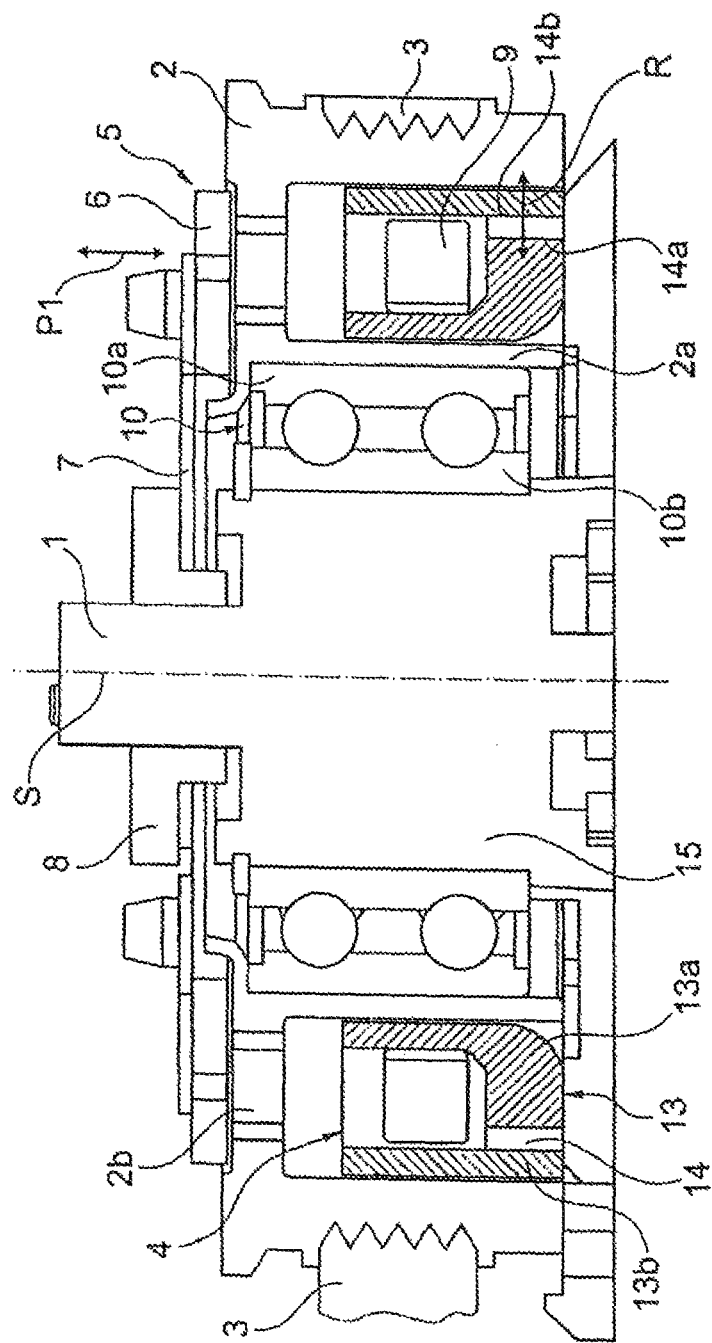

FRICTION SWITCH COUPLING

FIELD OF THE INVENTION

This invention relates to a friction switch coupling.

BACKGROUND OF THE INVENTION

To transmit torque between a rotor and an element to be driven by the rotor, switchable friction couplings are known with which parts to be coupled together, such as disk-like clutch components, can be optionally separated or connected together by friction or force fit.

Such friction switch couplings e.g. with a friction disk clutch can be formed as magnetic couplings which comprise an electromagnet arrangement with a coil body which can be electrically powered, e.g. a wire winding and coil carrier of magnetically conductive material.

These also include arrangements which in addition comprise permanent magnets, by the magnetic effect of which, when the electric magnets are not powered or not magnetically active, a movable coupling or armature element is attracted against the effect, e.g. a spring force, onto a counter segment and these are connected by force fit for torque transmission. When the electromagnet is powered, with the magnetic field then generated by the coil, the effect of the permanent magnets can be weakened or eliminated so that under the effect of the spring force, the friction coupling moves out of engagement, wherein the movable armature element leaves the force-fit position.

Such so-called fail-safe couplings are consequently held in a switched state due to the magnetic effect of permanent magnet means even when the electromagnet arrangement is not powered. The permanent magnet means are usually arranged in the manner of disks, for example, between two shells of the coil body. The magnetization direction of the permanent magnet means is axial in relation to the axis S about which the rotor rotates.

Because of their external dimensions, in particular in the direction radial to the rotor axis, the known friction switch couplings discussed have previously been unable to be used for all desired application possibilities, or can only be used when sufficient radial construction space is available.

SUMMARY OF THE INVENTION

The object of the present invention is to improve friction switch couplings of the type cited initially, in particular, to provide these in a compact form or with a view to economic production.

The invention is based on a friction switch coupling for torque transmission from a rotor which can be driven about an axis S to an element to be driven, comprising a friction disk clutch with an electromagnet arrangement which comprises a coil body and a ferromagnetically conductive coil carrier supporting and at least partly surrounding the coil body, which carrier has a web segment lying radially outermost in relation to the coil body and oriented parallel to the axis S, and an inner web segment, and between the inner and outer web segments of the coil carrier are provided permanent magnet means via which an axially movable friction segment of the friction switch coupling can be connected magnetically with the rotor, wherein when the electromagnet arrangement is in electrically connected state, by weakening of the magnetic attraction effect of the permanent magnet means, the contact of the friction segment on the rotor can be eliminated. The friction segment is connected directly or indirectly with the element to be driven. Preferably, the element to be driven is also rotatable about the axis S.

The core of the present invention is that the radially outer web segment is formed exclusively as a tubular element. In particular, it is advantageous that the radially outer web segment has substantially no radial extensions, for example, no web-like or rib-like protrusions which are provided over its length circumferentially or axially on the radially outer web segment. These extensions or protrusions are also absent on both a radial outside and inside of the radially outer web segment.

With regard to production and space requirements, the radially outer web segment is advantageously formed as a simple or smooth tube or hollow part. Thus, in the case of limited space and installation conditions in the direction radial to the axis S, corresponding friction switch couplings and/or electromagnet arrangements can be implemented advantageously. The web segment thus contributes to the radial dimensions of the entire arrangement only with its wall thickness.

The radially outer web segment is present adjacent to the coil body over at least almost its entire axial length, e.g. in the manner of an outer sheathing. Particularly advantageously, the radially outer web segment protrudes slightly beyond the coil body in the direction axial to the axis S, wherein the permanent magnet means can be present on the outer web segment in this protruding region, preferably radially on the inside. A radially outside arrangement of the permanent magnet means on the radially outer web segment is also possible, wherein this is possible at arbitrary points over the entire axial extension of the radially outer web segment. The axial extension of the permanent magnet means is usually less than the axial extension of the outer web segment.

Usually the coil body is held embedded in a casting compound in a chamber which is at least partly surrounded by the coil carrier.

The radially inner web segment also preferably extends over at least almost the entire axial extension of the coil body. To form a common magnetization body, the two web segments are usually connected together via a physical connecting segment, for example, a radially outwardly bent portion of the radially inner web segment. The connection can be made in the region of the permanent magnet means, particularly the permanent magnet means are fixed in position between the two web segments. Preferably, the permanent magnet means on their opposing main sides are completely covered or embedded in a sandwich-like manner by opposing portions of the two web segments.

Advantageously the permanent magnet means are formed in the manner of annular disks with opposing planar main sides and narrow sides in between. The magnetic field lines of the permanent magnet means run in the magnetization direction or perpendicular to the main sides. The permanent magnet means can, for example, comprise several segmented permanent magnets or a continuous ring of a permanent magnet material.

The permanent magnet means are preferably formed of one piece or as a ring about the axis S, and/or continuously or e.g. interrupted.

The inner web segment in particular is designed such that it allows an optimum joining or connection with the outer web segment or tubular element. Thus, the entire arrangement allows a ring closure of the magnetic field lines of the permanent magnet means in the component portions to be magnetized.

In principle it is advantageous if a magnetization direction of the permanent magnet means, which runs parallel to the opposing planar main sides of the permanent magnet means, stands perpendicular to the axis S. In principle, however, an orientation of the permanent magnet means offset by 90 angular degrees is not excluded, i.e. parallel to the axis S.

Thus structurally a multiplicity of possibilities is available for achieving a very space-saving construction of the friction switch coupling or electromagnet arrangement and permanent magnet means, wherein advantageously this simple and compact tubular element serves as an outer web segment in all variants.

It is furthermore proposed that the tubular element has a constant wall thickness. Thus the radially outer web segment can be produced easily and/or from materials available commercially. The tubular element preferably has a constant inner and outer diameter or is formed as a tubular sleeve.

The tubular element or tube segment can however also have a varying wall thickness, in particular to save weight. In this context, for example, a tubular element of trapezoid cross-section is conceivable.

In addition, it is advantageous if the tubular element completely covers the permanent magnet means circumferentially on a casing surface. Thus the magnetic field lines can be formed advantageously, in particular with regard to the transition between the permanent magnet means and the tubular element. Also the permanent magnet means can thus be firmly attached to the tubular element in a stable and durable manner, for example, via a planar main side of the permanent magnet means. The opposite main side of the permanent magnet means can, for example, be in connection contact with an adjacent portion of the radially inner web segment of the coil carrier. It is, however, not excluded that the opposite main side of the permanent magnet means remains free, in particular spaced via an air gap opposite a portion of the rotor or the radially inner web segment.

Preferably the permanent magnet means are also formed tubular. Thus the permanent magnet means can be produced easily and arranged on the outer web segment and connected with the tubular element in a space-saving manner. Also tubular permanent magnet means are advantageous with regard to the rotationally symmetrical arrangement in the friction switch coupling. In particular corresponding portions which serve to form the magnetic field lines, i.e. in particular the rotor and inner web segment, can also be formed with suitable corresponding tubular portions so that advantageously the magnetic field lines pass through a circumferentially closed region of the friction switch coupling.

In an advantageous modification of the object of the present invention, the permanent magnet means are arranged in a volume of the tube portion on an inside of the tubular element. Thus again a space-saving construction of the coil carrier or the radially outer web segment is possible. The permanent magnet means can be present at or on the inside of the tubular element and/or where applicable at least partly countersunk in a corresponding depression, for example, inserted in a groove-like material recess of the tubular element. The permanent magnet means where applicable can also be inserted flush or at least partly protruding beyond adjacent portions on the inside of the tubular element.

Finally, it is also advantageous that the permanent magnet means sit on a portion of the coil carrier which in relation to the coil body extends further radially inward than the coil body. This means in particular a radial outside of the coil body. This is advantageous in the case of a radially constricted installation space.

In principle, however, different or other arrangements are conceivable. Firstly, as explained above, the permanent magnet means can be positioned with their radial outsides within or at least almost flush with a radial outside of the tubular coil body, or offset radially inward to the outside of the tubular coil body. However, where there is sufficient radial installation space, it is also conceivable that the permanent magnet means or tubular permanent magnet means are present at least partly or completely outside the radially outer extension of the coil body in the direction radial to the axis S.

In principle, the magnetization direction of the permanent magnet means can run perpendicular or parallel to the axis S.

BRIEF DESCRIPTION OF THE DRAWINGS

Further advantages and features of the present invention are explained below with reference to a schematically depicted embodiment example of an arrangement according to the invention.

The drawing shows an arrangement with a friction switch coupling according to the present invention.

DETAILED DESCRIPTION OF THE INVENTION

The drawing shows in cross-section an arrangement, for example, for a vehicle with internal combustion engine drive, with a friction switch coupling according to the present invention which is formed as a so-called "fail-safe" coupling. The arrangement comprises a shaft 1 which can be driven at least part of the time via a driven rotor 2. The shaft 1 serves, for example, to drive an ancillary device of the vehicle such as a fan or a coolant pump. The rotor 2 is driven via a drive belt 3 driven in circulation or a multiple V-belt which for torque transmission is in engagement with a belt contact contour matching the drive belt 3 and present circumferentially on the outside of the rotor 2.

The rotor 2 is mounted rotatable via a radially inner segment 2a of the rotor 2, for example, via a twin-row roller ball bearing 10, wherein the segment 2a is supported over almost its entire axial extension on an outer ring 10a of the roller ball bearing 10, over the entire axial length of the outer ring 10a. The roller ball bearing 10 itself is held with its inner ring 10b on a bearing segment 15 of the shaft 1 which has a greater diameter than the other shaft segments.

Also an electromagnet arrangement 4 is provided which can act on a friction disk clutch 5. When the friction switch coupling is in the switched state, the friction disk clutch 5 serves to transmit torque from the rotor 2 to the shaft 1 and comprises a friction disk or ferromagnetic armature disk 6 which is firmly connected with the shaft 1 and can move in the direction shown by double arrow P1 or axially to the shaft 1 or its rotation axis S. For this, the armature disk 6 is held via an actively sprung spring disk 7, for example, made of spring steel, wherein the spring disk 7 is firmly connected with a radially inner ring 8 and the ring 8 is in turn firmly connected with the shaft 1 via an angled segment.

The friction switch coupling with the armature disk 6 is formed such that the armature disk 6 in each case assumes one of two different operating positions. In a first operating position (not shown), the armature disk 6 is attracted by magnetic forces generated by permanent magnet means, for example, a permanent magnet ring 14, onto a facing counter segment 2b of the ferromagnetically conductive rotor 2, so that the two components 2b and 6 cooperate by force or friction fit and/or are connected rotationally fixed. To form a desired magnetic field line course, the armature disk 6 and the counter segment 2b are provided with openings offset to each other.

In the second operating position according to FIG. 1, the armature disk 6 is axially spaced from the counter segment 2b by a slight gap. For this operating position the electromagnet arrangement 4 is necessary, in order to generate a magnetic field when the electromagnet arrangement 4 is in switched or powered state, which magnetic field at least largely compensates for or counters the permanent magnet field of the permanent magnet means.

The electromagnet arrangement 4 held in a fixed position comprises a coil body which can be powered or supplied with electrical energy, here a coil 9. The coil 9 is surrounded at least partly by a coil carrier which is formed as a magnet body 13 consisting of a ferromagnetically conductive material. The coil 9, closed in the manner of a ring about the axis S, is surrounded by the magnet body 13 on the inside and outside radially to the axis S and on a side lying in between, in a U-shape in cross-section along the axis S.

The magnet body 13 is made of several parts and comprises a radially inner web segment 13a with a single angle, and a radially outer web segment 13b which is formed as a tubular element with constant wall thickness.

The radially inner web segment 13a is spaced on the inside by an air gap from the opposite segment 2a of the rotor 2. The radially outer web segment 13b is also spaced by an air gap from the rotor or an inside of the part with the belt contact contour.

Between the two web segments 13a and 13b are provided the permanent magnet means or permanent magnet ring 14. Here the permanent magnet ring 14 is connected with its main sides with the web segments 13a, 13b. A first main side of the permanent magnet ring 14 is in superficial connecting contact with a radially inner side of the web segment 13b, and a second main side of the permanent magnet ring 14 is in superficial connecting contact with a face of the web segment 13a on the angled part of the web segment 13a extending in the radial direction.

Thus in the direction radial to the axis S, a compact construction of a friction switch coupling according to the present invention can be achieved.

The thickness of the annular disk-like permanent magnet ring 14 lies, for example, in the order of magnitude of the wall thickness of the web segment 13b. The permanent magnet ring 14 is radially magnetized in relation to the axis S or has a corresponding magnetization direction R which extends perpendicular to the faces of the main sides of the permanent magnet ring 14.

The magnetization direction R extends transverse to two opposing planar main sides 14a, 14b of the permanent magnet ring 14. The permanent magnet ring 14 is covered over its full radial outside casing surface or main side 14b by a portion of the tubular sleeve-like web segment 13b, and on the other main side 14a by a portion of the web segment 13a, and is thus embedded between the web segments 13a, 13b.

Due to the axial attraction of the armature disk 6 against the counter segment 2b in force-fit connection when the electromagnet arrangement 4 is not powered, a drive effect is transmitted to the shaft 1 when the driven rotor 2 is rotating.

If the torque transmission to the shaft 1 is eliminated while the rotor 2 is rotating, the coil 9 is powered by the electromagnet arrangement 4, whereby a magnetic field is generated which counters the magnetic field of the permanent magnet ring 14, so that a resulting magnetic field is so small, or where applicable a magnetic field which is almost completely eliminated disappears, such that the spring force of the spring disk 7 acting on the armature disk 6 ensures that the armature disk 6 is moved away from the counter segment 2b. The shaft 1 is therefore not driven in rotation.

LIST OF REFERENCE NUMERALS

1 Shaft
2 Rotor
2a Segment
2b Counter segment
3 Drive belt
4 Electromagnet arrangement
5 Friction disk clutch
6 Armature disk
7 Spring disk
8 Ring
9 Coil
10 Roller ball bearing
10a Outer ring
10b Inner ring
13 Magnet body
13a Web segment
13b Web segment
14 Permanent magnet ring
14a Main side
14b Main side
15 Bearing segment

The invention claimed is:

1. A friction switch coupling for torque transmission from a rotor which can be driven about an axis S to an element to be driven, comprising a friction disk clutch with an electromagnet arrangement which comprises a coil body and a ferromagnetically conductive coil carrier configured to support and at least partly surround the coil body, the carrier having an outer web segment lying radially outermost in relation to the coil body and oriented parallel to the axis S, and an inner web segment, and between the inner and outer web segments of the coil carrier a permanent magnet means is held in a fixed position so as to connect an axially movable friction segment of the friction switch coupling magnetically with the rotor, wherein when the electromagnet arrangement is in electrically connected state, by weakening of a magnetic attraction effect of the permanent magnet means, the contact of the friction segment on the rotor is eliminated, wherein the radially outer web segment is formed exclusively as a tubular element, with the outer web segment comprising a tubular axially extending sleeve shape having a constant inside diameter surface and a constant outside diameter surface with no radial protrusions extending therefrom, and the permanent magnet means is fixed directly to the inside diameter surface at one end of the outer web segment.

2. The friction switch coupling according to claim 1, wherein the tubular element has a constant wall thickness.

3. The friction switch coupling according to claim 1, wherein the tubular element completely covers the permanent magnet means circumferentially on a casing surface.

4. The friction switch coupling according to claim 1, wherein the permanent magnet means are also formed tubular.

5. The friction switch coupling according to claim 1, wherein the permanent magnet means are arranged in a volume of a tube portion on an inside of the tubular element.

6. The friction switch coupling according to claim 1, wherein the permanent magnet means sit on a portion of the coil carrier which in relation to the coil body extends further radially inward than the coil body.

7. A friction switch coupling for torque transmission from a rotor which can be driven about an axis S to an element to be driven, comprising a friction disk clutch with an electromagnet arrangement which comprises a coil body and a ferromagnetically conductive coil carrier configured to support and at least partly surround the coil body, the carrier having an outer web segment lying radially outermost in relation to the coil body and oriented parallel to the axis S, and an inner web segment, and between the inner and outer web segments of the coil carrier a permanent magnet means is held in a fixed position so as to connect an axially movable friction segment of the friction switch coupling magnetically with the rotor, wherein when the electromagnet arrangement is in electrically connected state, by weakening of a magnetic attraction effect of the permanent magnet means, the contact of the friction segment on the rotor is eliminated, wherein the radially outer web segment is formed exclusively as a tubular element with no protrusions such that the outer web segment has inside and outside axially extending planar surfaces that are parallel, and the permanent magnet means is fixed directly to the inside axially extending planar surface at one end of the outer web segment.

* * * * *